United States Patent
Mazouzi et al.

(10) Patent No.: US 7,472,515 B2
(45) Date of Patent: Jan. 6, 2009

(54) CABLE TENSIONER

(75) Inventors: Mustapha Mazouzi, Villiers sur Marne (FR); Marc Pradet, La Ferte St. Aubin (FR); Pascal Bonduel, Bouzy la Foret (FR)

(73) Assignee: ArvinMeritor Light Vehicle Systems—France, Sully-sur-Loire (FR)

( * ) Notice: Subject to any disclaimer, the term of this patent is extended or adjusted under 35 U.S.C. 154(b) by 442 days.

(21) Appl. No.: 11/010,640

(22) Filed: Dec. 13, 2004

(65) Prior Publication Data

US 2005/0194580 A1    Sep. 8, 2005

(30) Foreign Application Priority Data

Dec. 19, 2003    (FR) .................................. 03 15043

(51) Int. Cl.
*E05F 11/48* (2006.01)

(52) U.S. Cl. .................................... 49/352; 74/501.5 R

(58) Field of Classification Search .................. 49/352, 49/349; 74/501.5 R; 254/231, 232, 233, 254/234

See application file for complete search history.

(56) References Cited

U.S. PATENT DOCUMENTS

| | | | | |
|---|---|---|---|---|
| 4,334,438 A | | 6/1982 | Mochida | |
| 4,344,518 A | * | 8/1982 | Gilmore | ................. 192/111.12 |
| 4,753,124 A | * | 6/1988 | Chevance | .............. 74/501.5 R |
| 4,829,845 A | * | 5/1989 | Suzuki | ....................... 74/502.4 |
| 5,694,717 A | * | 12/1997 | Gier | ............................. 49/352 |
| 5,724,858 A | * | 3/1998 | Polando | ..................... 74/502.6 |
| 5,842,382 A | * | 12/1998 | Gabas | .................. 74/501.5 R |
| 6,193,621 B1 | | 2/2001 | McClosky | |

FOREIGN PATENT DOCUMENTS

DE    197 06 866    9/1998
EP    0 244 303    11/1987

OTHER PUBLICATIONS

French Search Report dated Jul. 14, 2004.

* cited by examiner

*Primary Examiner*—Gregory J. Strimbu
(74) *Attorney, Agent, or Firm*—Carlson, Gaskey & Olds

(57) ABSTRACT

A cable tensioner for a vehicle window regulator includes a screw and nut assembly with an irreversible thread lead angle, a first spring designed to actuate the screw and nut assembly when there is slack in a cable and a second spring designed to block the screw and nut assembly when there is excessive tension in the cable. The cable tensioner ensures that compensation for the elongation of the cable is irreversible.

24 Claims, 2 Drawing Sheets

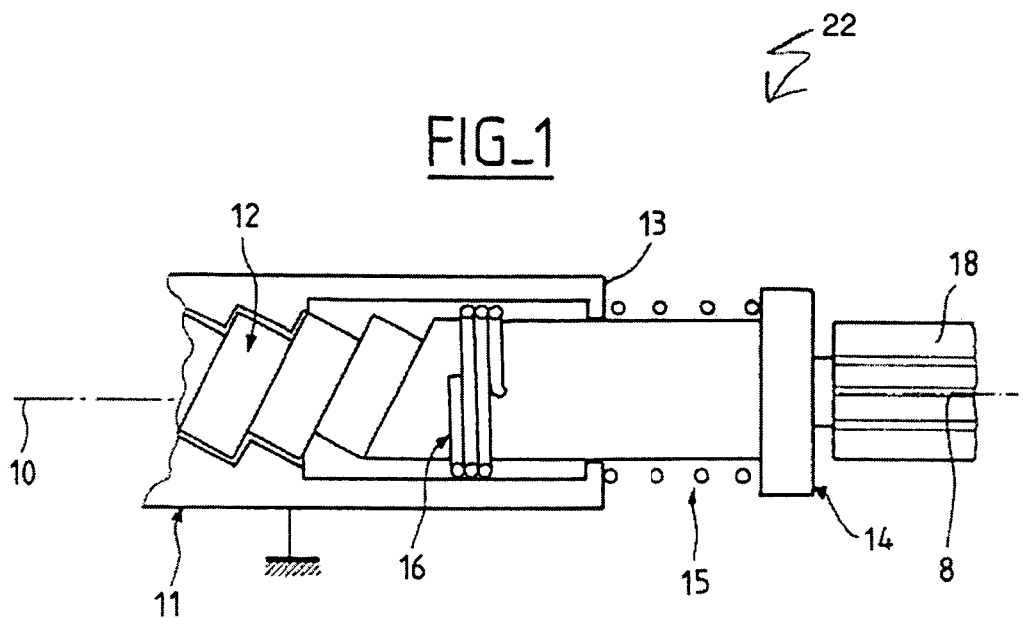
FIG_1
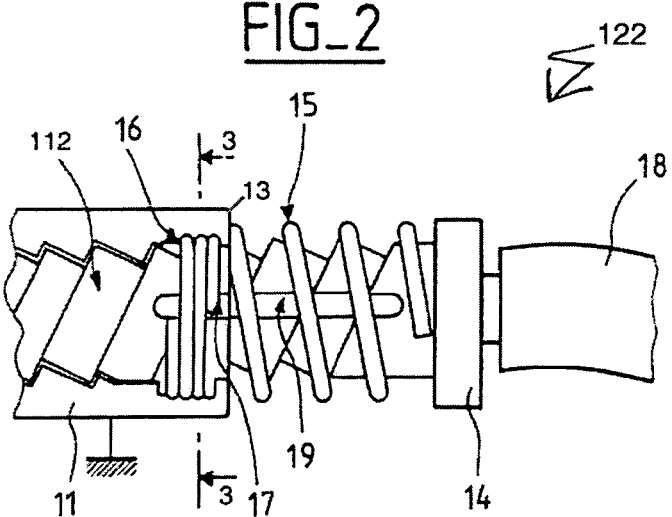
FIG_2
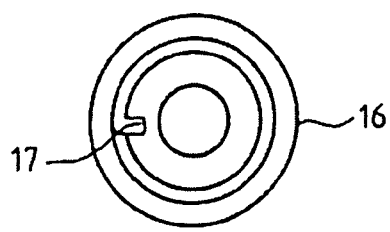
FIG_3

CABLE TENSIONER

REFERENCE TO RELATED APPLICATION

This application claims priority to French Patent Application FR 03 15 043 filed on Dec. 19, 2003.

BACKGROUND OF THE INVENTION

This invention relates generally to a cable tensioner, and in particular to a cable tensioner for a window regulator device.

A window regulator is a device used in a motor vehicle fitted with a window to transmit a driving force to the window. The window regulator includes a drive component, such as a cable or a belt, connected to a driving mechanism, such as a crank or a motor, which moves the window. The window can be driven by slides that move along guide rails under the action of the cable. The cable can be split into a lower cable and an upper cable wound in opposite directions on a drum driven by the motor or the crank.

The tension of the cable in the window regulator must be well controlled throughout its service life. Slack in the cable loop causes inaccurate movement of the window relative to a position expected by the drive system.

The accuracy of the operation of the window regulator is important and particularly critical in window regulators used in frameless doors. In certain models of window regulator in frameless doors, the window lowers slightly when the door is opened to disengage from the roof seal. The movement of the window must therefore be accurate to not impede the opening of the door. However, this movement must not be too great either in order to comply with the requirements of the regulations, in particular regarding anti-pinch regulations. The drive cable of the window must therefore have sufficient tension to guarantee accurate movement of the window.

However, the components that make up the window regulator device undergo gradual ageing which leads to the apparent elongation of the cable due, for example, to wear of the driving drum and the pulleys or cable sheath shortening due to compression or pulley metal creep. The elongation of the cable due to the ageing of the different parts of the window regulator must be compensated for.

Play compensation mechanisms are known that absorb cable elongation to guarantee sufficient tension for the satisfactory operation of the window regulator device.

Most of the play compensation mechanisms are systems that operate according to a stepped mode, based on detents of greater or smaller size, such as the one disclosed in German patent application DE 197 06 866 A.

To guarantee greater uniformity in tension, it is preferable to use a continuous compensation system that avoids threshold effects. Such a mechanism is disclosed in patent application EP 0 244 303 and includes a cable tensioner with a screw and a nut that is acted upon by a push rod and a flexible component. In one direction, the screw can, under an axial thrust of the flexible component, carry out a helical movement in the nut each time the force exerted by the push rod disappears or is reduced. In the other direction, the screw cannot carry out any rotation or translation in the nut. This mechanism is an irreversible friction based system. Thus, when play is likely to occur between two parts linked to the tensioner screw, play is automatically compensated for as it occurs by the one-way movement of the screw.

However, this mechanism is not completely irreversible. For example, if grease or any other substance that reduces the coefficient of friction (for example coming from the cable or the drum of the window regulator) is introduced between the screw and the nut of the cable tensioner, the screw can then translate in the nut in the reverse direction. Thus, excessive tension in the cable, for example due to excess torque when the window is in the upper position or the lower position, can cause a reverse translation of the tensioner screw and an undesirable elongation of the cable.

There is therefore a need for a cable tensioner that compensates for play in a cable in a window regulator device and that ensures absolute irreversibility of the cable tensioner.

SUMMARY OF THE INVENTION

The invention provides a cable tensioner including a screw and nut assembly with an irreversible thread lead angle, a first spring designed to actuate the screw and nut assembly when there is slack in the cable, and a second spring designed to block the screw and nut assembly when there is excessive tension in the cable.

According to one embodiment, the first spring is stressed between the fixed nut and a stop of a cable sheath.

According to one embodiment, the second spring is a torsion spring housed in the fixed nut. According to another embodiment, the second spring is coiled around the screw so that the diameter decreases when there is slack in the cable and increases when there is excessive tension in the cable. According to one embodiment, an end of the second spring is fixed to the screw. According to another embodiment, the second spring includes a curved end forming a finger that is inserted into a longitudinal groove in the screw. According to yet another embodiment, the second spring has an internal diameter such that the second spring is clamped against the interior wall of the nut in a state of rest.

The invention thus relates to a window regulator including a tensioned cable for actuating the movement of a window and a cable tensioner according to the invention.

The invention also provides an openable member, such as a window, for a motor vehicle fitted with a cable driving device including a cable tensioner according to the invention.

Other characteristics and advantages of the invention will become apparent when reading the following detailed description of embodiments of the invention, given as an example only and with reference to the attached drawings.

BRIEF DESCRIPTION OF THE DRAWINGS

FIG. 1 shows a cable tensioner according to a first embodiment of the invention;

FIG. 2 shows a cable tensioner according to a second embodiment of the invention;

FIG. 3 shows a section view of the second spring of the cable tensioner according to the second embodiment of the invention.

DETAILED DESCRIPTION OF PREFERRED EMBODIMENTS

Figure 4:
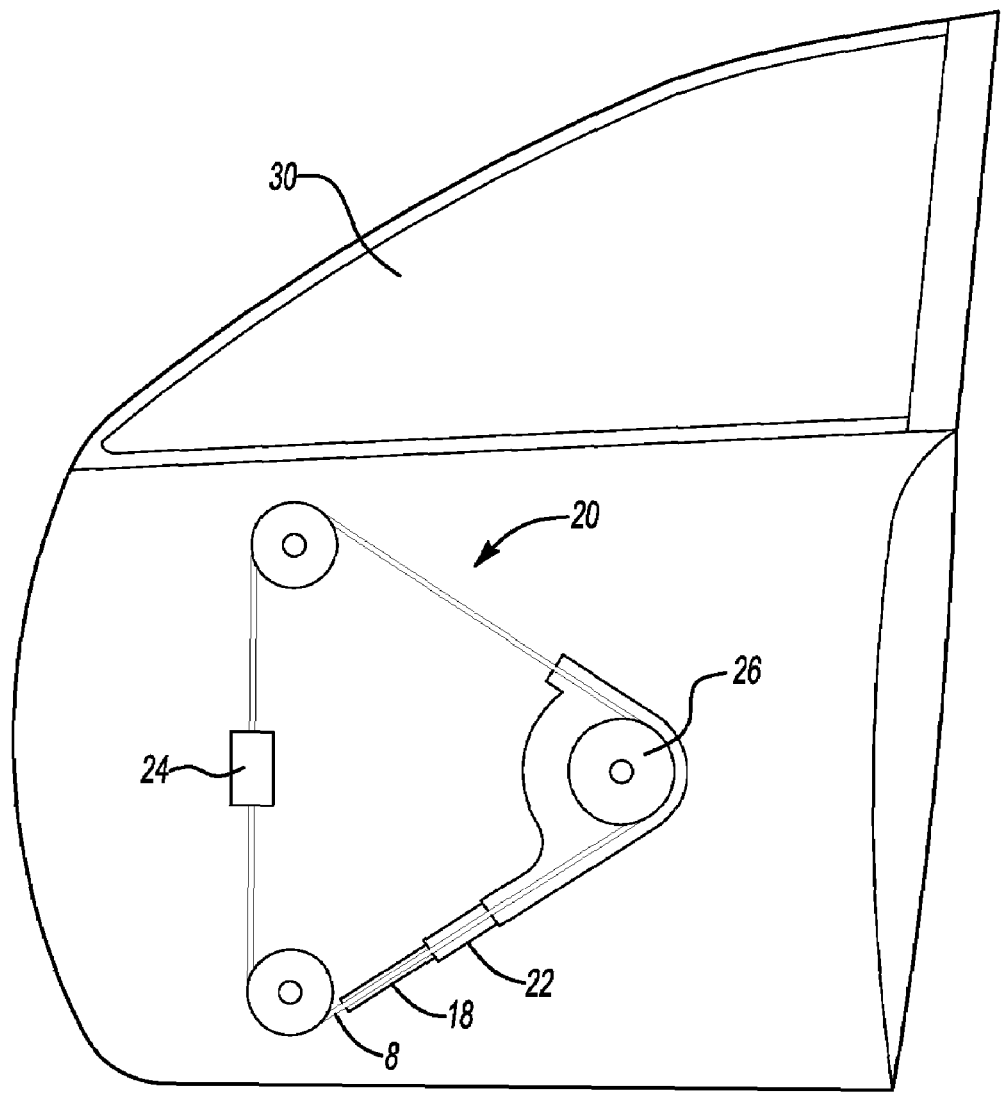
FIG. 4 shows a window regulator.

The cable tensioner according to the invention can be arranged on a cable run of a window regulator device. When the cable becomes slack, for example due to mechanical wear caused by ageing, the cable tensioner absorbs the elongation by lengthening the cable run. However, the elongation must be completely irreversible, i.e., the cable must not lengthen under the effect of high tension, for example, when the window is in an upper position or a lower position.

The cable tensioner according to the invention thus has a double mechanism for compensating for the elongation of the cable and for blocking the elongation of the tight cable. The cable tensioner includes a screw and nut assembly having an irreversible thread lead angle, a first spring designed to actuate the screw and nut assembly when there is slack in the cable and a second spring designed to block the screw and nut assembly when there is excessive tension in the cable. Thus, by employing the second spring combined with the first spring, it is possible to guarantee that the compensation for elongation of the cable is completely irreversible.

The invention will be described in detail with reference to FIGS. 1 and 2. The cable tensioner 22 is centered on an axis 10 of a cable run of a window regulator device 20. The window regulator device 20 may include a slide 24 to be fixed to a window 30 and a cable winding drum 26, as shown in FIG. 4. It is preferably placed on the lower cable of the mechanism, which is the "slack side" of the mechanism when it is in an upper position.

The cable tensioner 22 includes a screw and nut assembly. A nut 11 is fixed, and a screw 12 is mobile in the nut 11. The nut 11 denotes not only the internal thread designed to receive the screw 12, but also the support in which the thread is made. This support can be any shape and dimension suited to the desired application.

The screw and nut assembly includes an irreversible thread lead angle. For example, the screw 12 and the nut 11 have a complementary helix angle such that the screw 12 can helically move in the nut 11 in one direction under an axial stress of a flexible component and cannot normally carry out any translation or rotation in the nut 11 in the opposite direction.

The cable tensioner 22 according to the invention also includes a first spring 15 and a second spring 16. The first spring 15 is a compression spring, and the second spring 16 is a torsion spring.

The first spring 15 is, for example, compressed between a shoulder 13 of the nut 11 and a stop 14 of a cable sheath 8. A sleeve 18 can be aligned with the axis 10 of the cable run and can be pushed onto the cable sheath 8, for example, to strengthen the assembly.

The second spring 16 is housed in the nut 11 between an interior wall of the nut 11 and a stem of the screw 12. The internal diameter of the second spring 16 is chosen such that, in a rest position, the second spring 16 is clamped against the interior wall of the nut 11. The second spring 16 is coiled around the screw 12, and one of the ends is attached to the screw 12. The direction of coiling is such that the diameter of the second spring 16 decreases when the screw 12 tries to move in the nut 11 in the direction of screwing (i.e., in the direction of movement permitted by the irreversible thread pitch) and increases when the screw 12 tries to move in the nut 11 in the reverse direction.

Thus, the second spring 16 supplements the function of the irreversible thread pitch of the screw and nut assembly. Since the second spring 16 is housed inside the nut 11, the turns of the coil rub against the interior wall of the nut 11 and block the screw 12 from advancing in the undesirable direction when the diameter of the second spring 16 increases. Conversely, when the diameter of the second spring 16 decreases, the screw 12 can advance in the nut 11 without friction. The second spring 16 remains attached to the screw 12 to carry out the function as a brake, regardless of the position of the screw 12 in the nut 11.

According to a first embodiment, illustrated in FIG. 1, the first spring 15 is arranged in series with the screw and nut assembly, i.e., the first spring 15 extends from the screw 12.

According to the first embodiment, the second spring 16 is arranged in series with the threaded part of the screw 12. For example, one end of the second spring 16 is fixed to a non-threaded part of the stem of the screw 12.

According to a second embodiment cable tensioner 122 illustrated in FIG. 2, the first spring 15 is arranged in parallel with the screw and nut assembly, i.e., the first spring 15 surrounds the screw 112. The first spring 15 is, for example, a helical spring compressed between the shoulder 13 of the nut 11 and the stop 14 of the cable sheath 8. The screw 112 then has a threaded part that extends from the stop 14 of the cable sheath 8 to the nut 11.

According to the second embodiment, the second spring 16 is arranged on the threaded part of the screw 112. The second spring 16 has a curved end that forms a finger 17, as can be seen in FIG. 3, and the screw 112 has a groove 19 in which the finger 17 is placed. The cooperation of the finger 17 in the groove 19 provides a mobile point of attachment of the second spring 16 on the screw 112 to keep the second spring 16 attached to the screw 112 regardless of the position of the screw 112 in the nut 11.

When the screw 112 translates in the nut 11 to compensate for the elongation of the cable sheath 8, the diameter of the second spring 16 decreases and the finger 17 of the second spring 16 can slide along the groove 19 during the translation. When the screw 112 attempts to carry out a reverse translation in the nut 11, the diameter of the second spring 16 increases and the finger 17 of the second spring 16 blocks the rotation of the screw 112. The friction of the turns of the coil of the second spring 16 against the interior wall of the nut 11 prevents the finger 17 from sliding in the groove 19.

The cable tensioner 22 according to the invention operates in the following way. When the window regulator device 20 is in a lower position, the cable sheath 8 is tight. The tension P exerted by the cable sheath 8 on the cable tensioner 22 is between 500 N and 700 N, depending on the maximum torque of the motors used in the window regulator device 20. The tension P is much greater than the force exerted by the first spring 15 (usually 10 N to 80 N), which is therefore compressed. It is thus the irreversible character of the cable tensioner 22 that blocks any movement of the screw 12.

When the window regulator device 20 leaves the lower position to raise the window 30, the lower cable slackens. When the window 30 arrives at the upper position, a maximum tension P corresponding to the maximum torque of the motor is then exerted on the upper cable. The first spring 15 of the lower cable then moves the screw 12 to compensate for the slack that has appeared in the cable, for example, due to the wear of certain parts of the window regulator device 20. The stiffness of the first spring 15 is chosen such that the return force f becomes greater than the tension of the slack lower cable, in particular when the window regulator device 20 arrives at the upper position.

At the same time, the second spring 16 is compressed by the rotation of the screw 12 in the nut 11 and the diameter decreases to not obstruct the translation of the screw 12 in the nut 11.

When, under the effect of the return force f of the first spring 15, the screw 12 has been moved to extend the cable run and thus absorb the elongation due to wear, the tension in the cable once again becomes equivalent to the return force f of the first spring 15, which immobilizes the screw 12.

By contrast, if the tension P of the cable sheath 8 becomes very high, to the point where it risks causing a translation of the screw 12 in the nut 11 in the reverse direction to that of the screw thread (for example, when the direction of manuevering of the window 30 is reversed), the second spring 16 will be stretched at the beginning of the reverse rotation of the screw 12. The diameter of the second spring 16 will increase and will then block the undesirable movement of the screw 12 by friction against the nut 11.

The cable tensioner 22 is particularly suited for arrangement on a window regulator cable run, but can also be adapted to any other cable remote control device that requires compensation for play.

A preferable application of the invention therefore relates to openable members such as windows 30 of a motor vehicle, and in particular frameless doors.

Of course, this invention is not limited to the embodiments described as an example. Thus, the arrangement of the first spring 15 and the second spring 16 and the direction of actuation of the screw 12 in the nut 11 can be adapted according to the embodiments of the cable tensioner 22. In particular, the first spring 15 could be an extension spring with a suitable arrangement with respect to the screw and nut assembly and a suitable position on the cable run.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A cable tensioner comprising:
a screw and nut assembly including a fixed nut and a mobile screw, said screw having a screw thread engaged with a screw thread of said nut, the screw threads having an irreversible thread lead angle;
a first resilient member which rotates the screw relative to said nut when there is slack in a cable; and
a second resilient member which blocks rotation of the screw relative to said nut when there is excessive tension in the cable by expanding radially and engaging an inner surface of said fixed nut.

2. The cable tensioner according to claim 1, further including a cable sheath having a stop, wherein the first resilient member is stressed between the fixed nut and the stop of the cable sheath.

3. The cable tensioner according to claim 1, wherein the second resilient member is a torsion spring housed in the fixed nut.

4. The cable tensioner according to claim 1, wherein the second resilient member is coiled around the mobile screw, and a diameter of the second resilient member decreases when there is slack in the cable.

5. The cable tensioner according to claim 1, wherein the second resilient member includes an end fixed to the mobile screw.

6. The cable tensioner according to claim 1, wherein the mobile screw includes a longitudinal groove, and the second resilient member includes a curved end forming a finger that is inserted into the longitudinal groove.

7. The cable tensioner according to claim 1, wherein the second resilient member is clamped against the inner surface of the fixed nut when the second resilient member is in a state of rest.

8. The cable tensioner according to claim 1 wherein the first resilient member is outside the fixed nut.

9. The cable tensioner according to claim 1 wherein an outer diameter of the second resilient member is entirely surrounded by the fixed nut such that the second resilient member is encased in the fixed nut.

10. The cable tensioner according to claim 1 wherein the mobile screw is helically moveable.

11. A vehicle window regulator comprising:
a tensioned cable for actuating movement of a window; and
a cable tensioner including a screw and nut assembly having a fixed nut and a mobile screw, said screw having a screw thread engaged with a screw thread of said nut, the screw threads having an irreversible thread lead angle, the cable tensioner further including a first resilient member which rotates the screw relative to the nut when there is slack in the cable and a second resilient member which blocks rotation of the screw relative to said nut when there is excessive tension in the cable by expanding radially and engaging an inner surface of said fixed nut.

12. The vehicle window regulator according to claim 11, further including a cable sheath having a stop, wherein the first resilient member is stressed between the fixed nut and the stop of the cable sheath.

13. The vehicle window regulator according to claim 11, wherein the second resilient member is a torsion spring housed in the fixed nut.

14. The vehicle window regulator according to claim 11, wherein the second resilient member is coiled around the mobile screw, and a diameter of the second resilient member decreases when there is slack in the cable.

15. The vehicle window regulator according to claim 11, wherein the second resilient member comprises an end fixed to the mobile screw.

16. The vehicle window regulator according to claim 11, wherein the mobile screw includes a longitudinal groove, and the second resilient member includes a curved end forming a finger that is inserted into the longitudinal groove.

17. The vehicle window regulator according to claim 11, wherein the second resilient member is clamped against the inner surface of the fixed nut when said second resilient member is in a state of rest.

18. The vehicle window regulator according to claim 11 wherein an outer diameter of the second resilient member is entirely surrounded by the fixed nut such that the second resilient member is encased in the fixed nut.

19. The vehicle window regulator according to claim 11 wherein the mobile screw is helically moveable.

20. The vehicle window regulator according to claim 11 wherein the first resilient member is outside the fixed nut.

21. A member for a motor vehicle incorporating a cable driving device, the member comprising:
a cable tensioner including a screw and nut assembly having a fixed nut and a mobile screw, said screw having a screw thread engaged with a screw thread of said nut, the screw threads having an irreversible thread lead angle, the cable tensioner further including a first resilient member which rotates the screw relative to said nut when there is slack in a cable and a second resilient member which blocks rotation of the screw relative to said nut when there is excessive tension in the cable by expanding radially and engaging an inner surface of said fixed nut.

22. The member according to claim 21 wherein the first resilient member is outside the fixed nut.

23. The member according to claim 21 wherein an outer diameter of the second resilient member is entirely surrounded by the fixed nut such that the second resilient member is encased in the fixed nut.

24. The member according to claim 21 wherein the mobile screw is helically moveable.

* * * * *